June 11, 1957 J. F. WILLIAMS 2,795,080
APPARATUS FOR DISPENSING INSECTICIDE POWDERS
Filed July 18, 1955 3 Sheets-Sheet 1
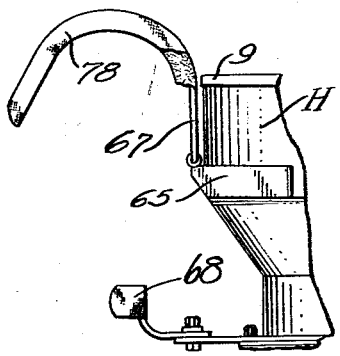
Fig. 5.
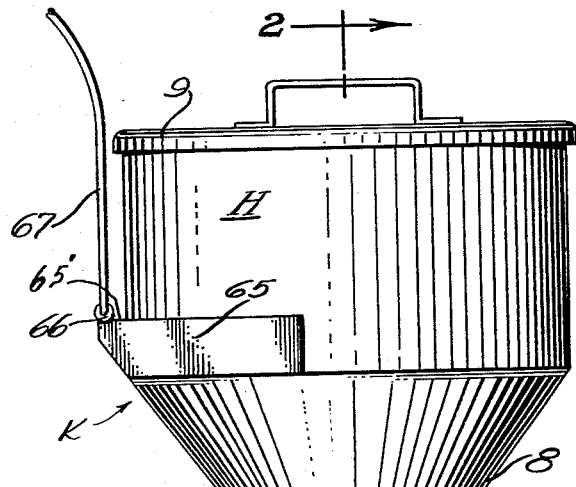
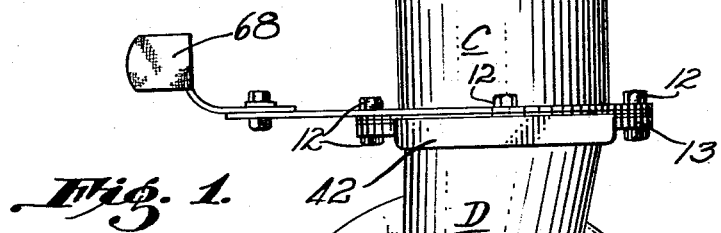
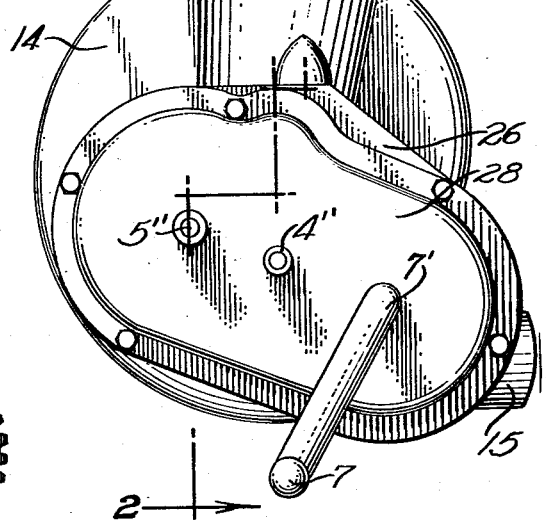
Fig. 1.
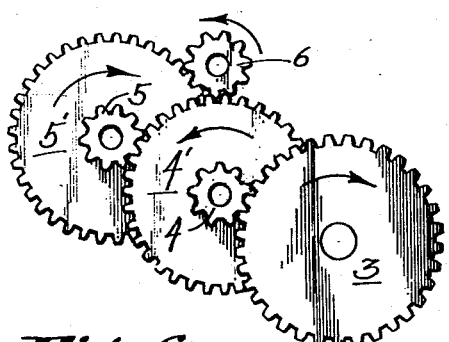
Fig. 6.
Inventor:
JOHN F. WILLIAMS
By *Jwaley Everett*
Attorney June 11, 1957      J. F. WILLIAMS      2,795,080
APPARATUS FOR DISPENSING INSECTICIDE POWDERS
Filed July 18, 1955      3 Sheets-Sheet 2
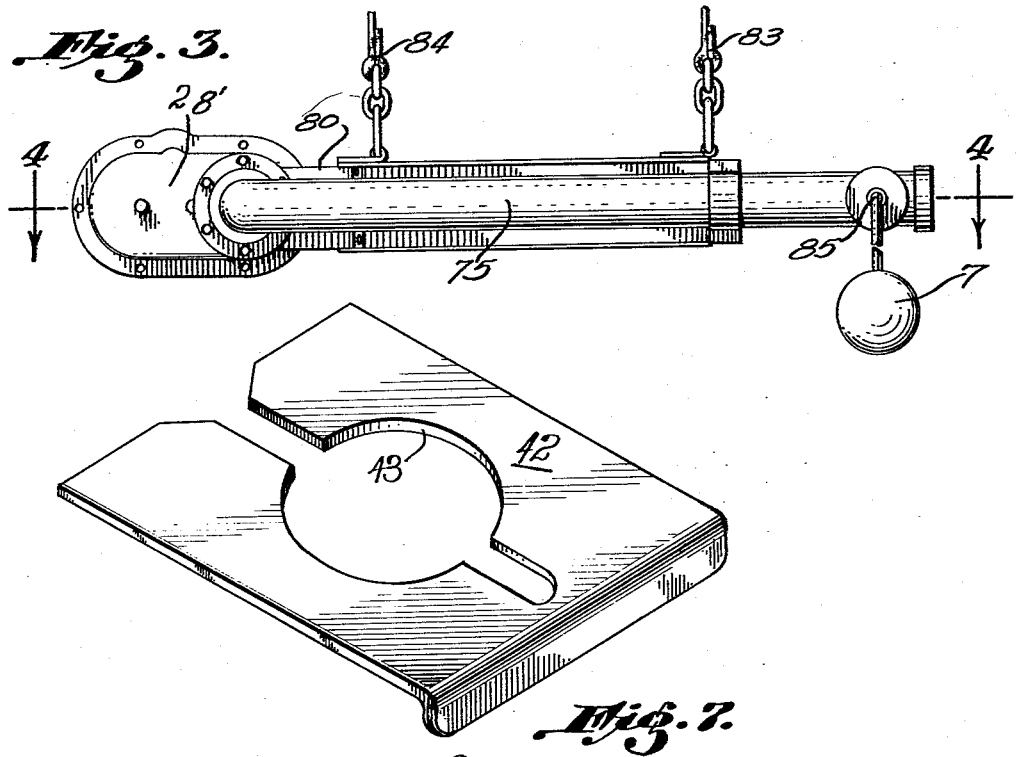
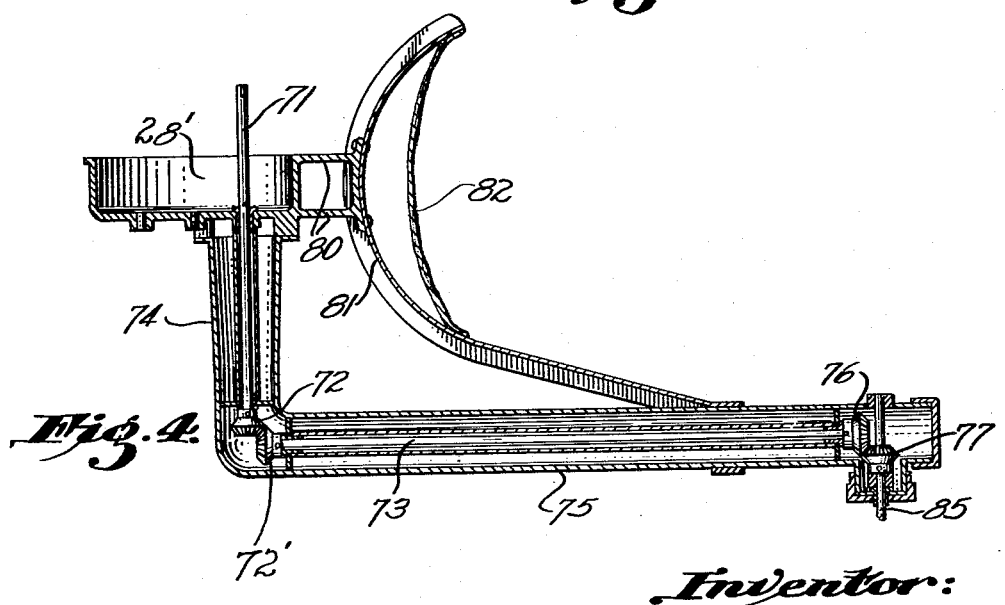
Inventor:
John F. Williams
By [signature]
Attorney

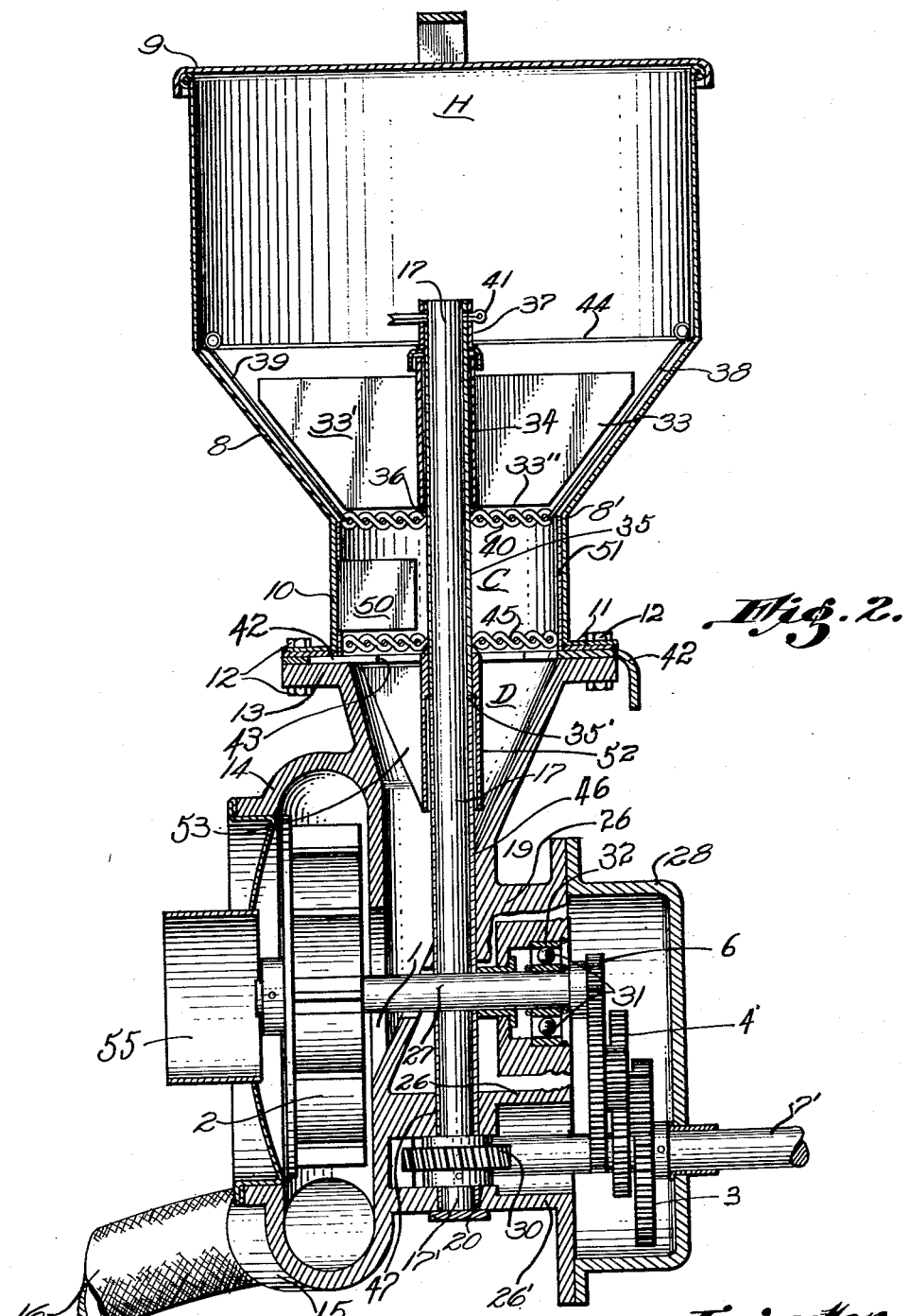

United States Patent Office 2,795,080
Patented June 11, 1957

2,795,080
APPARATUS FOR DISPENSING INSECTICIDE POWDERS

John Frederick Williams, Maidenhead, England

Application July 18, 1955, Serial No. 522,728

11 Claims. (Cl. 43—148)

This invention relates to an apparatus for feeding a powdered comminuted compound from a hopper or the like and more particularly it is concerned with a device for dispensing dusting powders such as insecticides and the like to plants.

Many attempts have been made to dispense powders from hoppers, but the difficulty in the past has been to ensure a constant rate of flow of the powder from the hopper at all levels as the latter empties, due chiefly to the tendency of insecticide powders to compact within the hopper or the passages leading from the hopper to the applicator or distributing nozzle.

It will be appreciated, however, that any tendency of the powder to cake or form small lumps, which is always liable to happen, especially with present day insecticide powders, may, under certain conditions, give unsatisfactory distribution because of the presence of heavier particles which on encountering the air stream produced by the fan, will, due to gravitation, drop and thereby clog up the passage to and from the fan.

The object of the present invention is to provide a hopper and feed mechanism which is accurate in operation and empties at a substantially constant rate irrespective of the amount of powdered material within the hopper, and which can be adjusted to give an accurate rate of flow at any desired rate.

According to the present invention a machine for applying insecticides and other finely divided powders to plants comprises a hopper for the powder, from which the powder, when the machine is in use, is caused to flow into a flow or regulating chamber bounded at its upper and lower ends respectively by rotatable reticulated discs, the upper disc serving as a support for the powder through which the powder passes to the flow or regulating chambers, a rotatable spindle extending through both chambers for supporting and rotating the discs, means such as one or more partitions or blades freely mounted within the hopper and by which it is divided into two or more compartments and adapted to retain the powder therein in a static condition, the whole being so arranged that on rotation of the upper disc powder will be delivered from the hopper into the powder flow regulating chamber in order to maintain a constant head of powder therein, the powder being delivered from said flow or regulating chamber by the lower discs through a duct to a fan housing, and a fan propeller which discharges the powder through a nozzle or applicator to the atmosphere.

In carrying out the invention there is preferably provided a rotatable vertical spindle extending centrally through the hopper and regulating chamber and is provided with a driving means adjacent its lower end.

Mounted over the spindle is a driven sleeve detachably secured to the upper end of the spindle to which there are fixed two reticulated disc elements. And freely mounted over the upper portion of the sleeve within the area of the hopper is a second sleeve to which is fixedly secured two or more partitions or blades evenly spaced whose outer edges are shaped to conform to the taper of the side or sides of the hopper and serve to prevent the powder from circulating around the hopper and caking upon the upper face of the upper reticulated disc element. The lower ends of the blades are of such length as to provide clearance between the disc and the lower edges of the blades. In addition, to prevent powder adhering to the sides of the hopper chamber there is preferably attached a pair of wires anchored at their lower ends to the perimeter of the uppermost disc and fastened at their upper ends to a cross piece fixed on the upper end of the rotating sleeve.

Figure 1 is a view in elevation of the improved dusting apparatus in accordance with a preferred embodiment of the invention.

Figure 2 is a slightly enlarged vertical sectional view of the same taken along the line 2—2 of Figure 1.

Figure 3 is a view in elevation of a modified form of operating element.

Figure 4 is a sectional view taken along the line 4—4 of Figure 3.

Figure 5 is a fragmentary view in elevation of a portion of the powder carrying hopper showing a shoulder supporting element.

Figure 6 is a view in elevation of the gear train for operating the apparatus.

Figure 7 is a view in perspective of a shutter for controlling the flow of powder to the duct leading to the fan.

Referring to the drawings, K indicates a casing wherein H indicates generally the hopper, C the powder flow or regulating chamber which receives the powder from the hopper and delivers it through an enclosed duct D into a fan inlet duct 1 to a fan impeller 2 which is driven through suitable gears, 3, 4, 4′, 5, 5′ and 6 by means of a handle 7 through a handle shaft 7′ impelling the powder through a discharge element which is only partly shown in Figure 2.

In the powder dispensing device of this invention the hopper H is provided with side walls 8 and may be of any convenient form and is fitted with a lid 9.

Adjacent the lower end 8′ of the side walls 8 there is preferably formed a cylindrical, or tubular, casing 10 to provide a powder flow or regulating chamber. 11 is a flange by which the regulating chamber is removably secured by nuts and bolts 12 to a flange 13 on the fan inlet duct D.

The duct D is preferably constructed integrally with a fan housing 14 in which there is a peripheral discharge opening 15 which is connected to a short piece of flexible hose 16. The other end of the hose is connected with a short length of rigid tubing carrying a nozzle on its outer end (which is not shown).

Extending upwardly through duct D, chamber C and hopper H is a vertical spindle 17. The lower end 17′ of the spindle is journalled to rotate in a bearing 20 located on the under side 26′ of a casing 26.

Incorporated in this casing 26 is the duct D, and the fan housing 14. The fan 2 is fixed upon one end of a horizontal shaft 27 which extends through the casing into a gear compartment at one side of the casing.

The gear compartment consists of a recessed plate 28. Extending through the plate is the handle shaft 7′. The inner end of the handle shaft is provided with a worm adapted to engage a gear wheel 30 which is fixed to the lower end 17′ of the spindle 17 for rotating the same, as hereinafter described.

The gear 3 is carried on the handle shaft 7′ and engages the gear 4 carried on the shaft 4″. The gear 4 is fixed to gear 4′, and the gear 4′ engages the gear 5 carried on the shaft 5″. The gear 5 is fixed to gear 5′, and the gear 5′ engages the gear 6 carried on the shaft 27 on which the fan 2 is fixedly secured. The shaft 27 is supported within the bearings 31 and 32. Through this gear chain it will be noted that the revolution of the fan is greatly increased in comparison to the revolution of the handle shaft 7′.

It is a feature of this invention that the caking of the powder in the hopper H is prevented by subdividing the hopper interior into two or more compartments by means of the retention blades, shown at 33 and 33′, which may be constructed of any suitable material, which function to retain the powder in a substantially static condition. The blades 33 and 33' are attached to a free floating sleeve 34, positioned over a driven sleeve 35, which rests on a thin washer 36 carried over the driven sleeve adjacent the upper surface of the upper reticulated disc 40. Over the outer end of the spindle 17 and the driven sleeve 35 is a dust retaining cap member 37 which is secured to the spindle 17 and the driven sleeve by the pin 41.

By reason of the fact that the outer sleeve 34 is freely carried on the driven sleeve 35 the partition blades 33 and 33', which may be regarded as wall structures will remain substantially stationary being held by the mass of powder within the hopper. These blades 33 and 33' at the same time substantially divide the hopper into two separate compartments each compartment thus having two straight sides formed by the two vertical faces of the blades and a third side by the inclined side 8 of the hopper. Any tendency of the powder in the hopper to build up on the inclined side is prevented by means of two wiping wires 38 and 39. These wires 38 and 39 are fixed at their lower ends to the perimeter of the reticulated disc 40 and at their upper ends to a cross piece 44.

The bottom edges 33" of the blades 33 and 33' are so formed that they just clear the upper surface of the rotating disc 40 which is secured to the driven sleeve 35.

Since the blades 33 remain substantially stationary in relation to the rotating disc 40 they will hold the powder in a substantially stationary position causing the rotating disc 40 to effect a scraping or sweeping action on the powder within the hopper. At the same time the lower edges 33" of the blades 33 will prevent any piling or caking of the powder on the upper side of the rotating disc 40. The powder in the hopper is kept flowing by the action of the stationary blades 33 and 33' and the rotating scraper wires 38 and 39.

To overcome the varying level or head of powder in the hopper it has been found necessary to make the powder discharged from the hopper form a column of a constant height from which the final rate of flow is regulated. This is done by providing a chamber C extending downwardly from the hopper having the above described disc 40 positioned adjacent its top which is also at the bottom 8' of the inclined sides 8 of the hopper.

At the bottom of the regulating chamber C there is provided a second reticulated disc 45 also fixed to the driven sleeve 35 and adapted to rotate therewith. The driven sleeve 35 extends downwardly over the top of the spindle 17 to a point 35' where it rotates upon the upper end of a fixed sleeve 46 which encases the lower end of the spindle 17. The sleeve 46 is fixed by a press fit into the opening 47 in the casing 26.

In order to retain the powder in a relatively stationary position within the chamber C, a plate 50 is formed integral with a compressible lining sleeve 51 surrounding the chamber. This plate has a similar action on the powder as the powder retention blades 33 have on the powder in the hopper. The plate 50 is held in a stationary position by the compressible liner 51, it being lightly pressed into the chamber C. The liner may be turned upside down to place the plate 50 adjacent the disc 40 if desired.

The discs 40 and 45 are preferably constructed of a relatively fine woven wire mesh, however it may be possible to use other types of perforated discs but wire mesh has been found to give the best results of the types of perforated discs.

When the chamber C is filled, that is, when the level of powder has reached the underside of the upper disc 40, the flow of powder to the chamber is arrested and a column of powder has been formed of a known height, i. e. the distance between the lower and upper discs.

As the disc 45 is also attached to the driven sleeve 35 it will effect a scraping action on the column of powder in the regulating chamber.

When this column of powder drops by reason of the scraping of the lower disc 45, more powder will be fed through the upper disc 40 into the chamber. The powder leaving the regulating chamber C through the disc 45 enters the duct D leading to the fan having intake 1.

Provision is made to increase or decrease the cross-sectional area of the opening leading from the regulating chamber C by means of slidable shutters such as shown at 42 in Figure 7. These shutters are provided with different size openings 43 which are interchangeable and are slidably secured between flange 11 on the lower end of chamber C and flange 13 at the upper end of the duct D by means of spacing strips between the two flanges.

Mounted within the inclined duct D, and fixed to a sleeve 52 which is fixedly secured to the lower end of the driven sleeve 35 is a rotatable plate 53. The plate is formed at an angle to correspond to the portion of the wall of the duct D through which the spindle 17 and the surrounding sleeves pass to prevent powder adhering to this portion of the wall. The plate is adapted to rotate with the driven sleeve 35.

To reduce the resistance to air flow due to friction losses at bends and corners, the fan is arranged to discharge forward through an exhaust opening 15 located adjacent the left lower end of the apparatus into a relatively short flexible hose 16. The opposite end of the hose is connected with a rigid tube (not shown) which the operator carries in his left hand. The outer end of the tube is provided with one or more suitable nozzles or applicator for directing the powder to the plants.

The apparatus shown in Figures 1, 2 and 5 is adapted to be carried in front of the operator. The top of the hopper H is adapted to extend substantially even with, or below, the chin of the operator. Attached to the hopper H is a member 65. Adjacent its upper edge 65' is a rolled lip 66 for hingedly securing a shoulder supporting member 67 having a padding 78 carried thereon.

Extending outwardly from the chamber C is a body support 68 adapted to engage the body about, or above, the waist to support and steady the apparatus against any swaying motion. When the apparatus is supported over the shoulders as just described, the operator operates the apparatus with his right hand by the crank handle 7, while his left hand guides a rigid tube carrying one or more nozzles (not shown) on its outer end directing the powder to the spot where it is desired to convey the powder. As the handle 7 is turned clockwise, the spindle 17 through the worm and gear 30 is slowly rotated. This rotates the reticulated scrapers 40 and 45 through the driven sleeve 35. Powder is scraped from the powder supply in the hopper by the disc 40 filling the regulating chamber C. When the chamber C is filled, the powder is then scraped from the underside of the stack of powder held in chamber C by the disc 45. This powder passes directly through the duct D, through the inlet 1, into the fan casing adjacent the hub of the rotating fan. At the same time the handle is operating the spindle it is also operating the fan. The fan is rotated at high speed to force the powder with a stream of air which it gets through the side opening 55.

The device may also be constructed to be carried on the back of the operator with a few modifications. In Figures 3 and 4 this modified form is shown. In this modification, the handle 7 and the handle shaft 7' are replaced with a shaft 71 having a pinion 72 which engages a second pinion 72'. The pinion 72' is secured to a shaft 73. The shaft 71 is supported within a housing 74 and the shaft 73 is supported within a housing 75. At the outer end of the shaft 75 is a second pinion gear 76 which engages a pinion 77. The gear cover plate 28 is replaced by the plate 28' which is fixed to the casing 26 in substantially the same manner as the recessed plate 28. When this attachment is installed, the apparatus may be carried on the back of the operator. The plate 28' is provided with a bracket 80 which is adapted to support a curved member 81 having one end connected with the outer end of the housing 75. Across the curved portion of the member is a strap member 82 to act as a cushion to the operator's back. The housing 75 is supported by suitable supports 83 and 84 which extend upwardly and connect with a shoulder support (not shown). A crank handle is fixed to the shaft 85 for operating the apparatus in the same manner, as has already been described for the form of apparatus carried in front by the operator.

When the apparatus is supported on the back, the shoulder straps 78 extending over the shoulders, as they do when the apparatus is carried in front except in reversed position, and the padding 82 on the curved support 81 press against the back adjacent the waist. In this position the crank on the shaft 85 extends outwardly in front of the operator on the right hand side and in position to be cranked by the right hand. The flexible hose 15 extends forward between the body and elbow of the left arm, the hose being connected to the previously described rigid tube which is held in the left hand for directing its outer end in the vicinity of the plants to receive the powdered ingredient.

While the apparatus is shown and described for a portable unit to be carried by the operator, it may be mounted on wheels, skids and the like and it may also be power operated. The general principle illustrated herein may be also applied to any situation where the control of a powder or comminuted material with air is desired, all of which may operate on the principles illustrated and described. Therefore, it is not intended that the invention be limited to the specific forms shown herein as the scope of the invention is best defined in the appended claims.

I claim:

1. A machine for applying powdered insecticides and other finely divided materials to plants comprising, in combination, a casing having an open bottom hopper for temporarily receiving the powder associated therewith, a housing below said hopper providing a powder regulating chamber, a reticulated type disc positioned between the bottom of the hopper and the upper end of the chamber, a second reticulated type disc positioned adjacent the lower end of the chamber, a fan housing forming a part of said casing, said casing having a downwardly and inwardly tapered duct leading downwardly from the bottom of the regulating chamber for conveying the powder from the second disc to said fan housing, a vertical rotatable spindle extending centrally through both the regulating chamber and the hopper and means for fixedly supporting the two discs upon said spindle in spaced relationship, said casing having a small opening leading from the lower end of the duct to the center of the fan housing, an air propeller fan rotatably mounted within said housing, an exhaust means leading from the fan housing to an applicator, and means for rotating the spindle and fan whereby, the powder is moved in regulated amounts from the hopper to the applicator.

2. A machine as claimed in claim 1 in which the sides of the hopper are tapered inwardly toward its bottom outlet, partition walls supported within at least the tapered portions of the hopper for preventing free circular motion of the powder within the hopper.

3. A machine as claimed in claim 1 in which a rotatable wiping means is provided in at least the tapered portion of the hopper, the wiping means adapted to rotate adjacent the walls of the hopper between the walls and the outer ends of the partition walls.

4. A machine as claimed in claim 1 in which the sides of the hopper are tapered inwardly toward its bottom outlet, partition walls within at least the tapered portions of the hopper for preventing free circular motion of the powder within the hopper, and means carried adjacent the center of the hopper for supporting said partition walls.

5. An apparatus for discharging a comminuted material having, in combination, a casing having a hopper associated therewith, said hopper having a bottom member provided with a rotatable horizontal disc having openings therein, a housing below said hopper providing a material regulating chamber of a predetermined height and diameter, said chamber having a rotatable disc bottom member of substantially the same construction as the first mentioned disc member for temporarily supporting the material within the chamber a fan housing and means for removing the material from beneath the second disc.

6. An apparatus for discharging a comminuted material comprising, in combination, a casing having a hopper provided with lower side walls associated therewith, said hopper having a bottom member provided with a rotatable disc having openings therein, a housing below said hopper providing a material regulating chamber of predetermined height and diameter, said chamber having a horizontal rotatable disc bottom member of substantially the same construction as the first mentioned disc for conducting the material through the bottom of the regulating chamber, a fan housing, said casing having an open top duct extending downwardly and inwardly from the bottom of the regulating chamber to a fan housing, said fan housing having an opening adjacent its center leading from the bottom end of the duct, a fan within said housing and exhaust means leading from the fan housing adapted to be connected to an applicator, and means for rotating the respective disc at relatively slow speed and for operating the fan at a relatively high speed, whereby the material is drawn from the duct and forced through the exhaust means to the applicator.

7. In an apparatus as claimed in claim 6 having rotating wiping means for wiping at least the lower side walls of the hopper, stationary partitions for preventing the material from moving in a circular path from the action of the rotatable disc at the bottom of the hopper.

8. An apparatus for controlling the flow of comminuted materials, comprising, in combination, an open bottom hopper adapted to receive the material, a chamber having an opening at its top and bottom and having one end connected with the open bottom end of the hopper, a perforated rotatable disc positioned between the open bottom end of the hopper and the upper top end of the chamber and a second perforated rotatable disc positioned to form a bottom in the said chamber and means for rotating the said discs.

9. In an apparatus as claimed in claim 8 having interchangeable means having various size openings located adjacent and below the second rotatable disc for regulating the amount of material flowing from the chamber.

10. In a device as set forth in claim 8 in which means are provided in the hopper area to restrain the circular motion of the material.

11. An apparatus for mixing a predetermined amount of comminuted material with a predetermined quantity of air comprising, in combination, a casing including an open bottom hopper adapted to receive the material, a chamber having an open top and bottom and having one end connected with the open bottom end of the hopper, a perforated rotatable disc positioned between the open bottom end of the hopper and the upper top end of the chamber and a second perforated rotatable disc positioned to form a bottom in the chamber and means for rotating the said disc, said casing having a duct below the second mentioned disc, and discharge means connected with said duct for removing the material after it has passed through the said second mentioned disc.

References Cited in the file of this patent

UNITED STATES PATENTS

| | | |
|---|---|---|
| 1,496,121 | Hoffman | June 3, 1924 |
| 2,713,977 | Noll | July 26, 1955 |